(12) United States Patent
Allal et al.

(10) Patent No.: US 12,348,500 B2
(45) Date of Patent: Jul. 1, 2025

(54) METHOD FOR CAPTURING A PACKET FROM AN ENCRYPTED SESSION

(71) Applicant: Orange, Issy-les-Moulineaux (FR)

(72) Inventors: Imed Allal, Chatillon (FR); Emile Stephan, Chatillon (FR); Gaël Fromentoux, Chatillon (FR); Arnaud Braud, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 367 days.

(21) Appl. No.: 18/007,963

(22) PCT Filed: Jun. 1, 2021

(86) PCT No.: PCT/FR2021/050992
§ 371 (c)(1),
(2) Date: Dec. 2, 2022

(87) PCT Pub. No.: WO2021/245350
PCT Pub. Date: Dec. 9, 2021

(65) Prior Publication Data
US 2023/0247009 A1    Aug. 3, 2023

(30) Foreign Application Priority Data

Jun. 4, 2020   (FR) .................................... 2005863

(51) Int. Cl.
*H04L 9/40*      (2022.01)
*H04L 47/2475*   (2022.01)
(Continued)

(52) U.S. Cl.
CPC ...... *H04L 63/0435* (2013.01); *H04L 47/2475* (2013.01); *H04L 47/35* (2013.01); *H04L 63/0414* (2013.01); *H04L 69/164* (2013.01)

(58) Field of Classification Search
CPC ............. H04L 63/0435; H04L 63/0414; H04L 67/141; H04L 69/164; H04L 67/02;
(Continued)

(56) References Cited

U.S. PATENT DOCUMENTS

| 10,389,690 | B2 * | 8/2019 | Nádas | ................... H04L 63/061 |
| 2005/0177506 | A1 | 8/2005 | Rissanen | |
| 2021/0273926 | A1 | 9/2021 | Stephan et al. | |
| 2023/0262004 | A1 * | 8/2023 | Allal | ................... H04L 63/0236 370/230 |

FOREIGN PATENT DOCUMENTS

| FR | 3081653 A1 | 11/2019 |
| WO | 2020043319 A1 | 3/2020 |
| WO | WO-2021009554 A1 * | 1/2021 |

OTHER PUBLICATIONS

E. Rescorla, Internet Engineering Task Force (IETF) Request for Comments: 8446: "The Transport Layer Security (TLS) Protocol Version 1.3", Aug. 2018, obtained online from <https://www.rfc-editor.org/rfc/pdfrfc/rfc8446.txt.pdf>, retrieved on Dec. 9, 2024 (Year: 2018).*

(Continued)

*Primary Examiner* — Zhimei Zhu
(74) *Attorney, Agent, or Firm* — David D. Brush; Westman, Champlin & Koehler, P.A.

(57) ABSTRACT

A method for capturing a packet from an encrypted session established between a terminal unit and a data server. The packet includes a datum for determining a security key used for the encryption of the packet. The method is implemented by a device routing the packet between the terminal unit and the data server and includes: analysis of a plurality of packets transmitted by the terminal unit and destined for the server; identification of a cooperation packet from among the plurality of analyzed packets, the cooperation packet including the determining datum corresponding to a security key used for the encryption of packets transmitted by the terminal unit to the data server prior to the terminal unit (Continued)

sending the cooperation packet; and decryption of the received cooperation packet using a security key corresponding to the determining datum from the identified cooperation packet.

11 Claims, 7 Drawing Sheets

(51) Int. Cl.
  *H04L 47/35* (2022.01)
  *H04L 69/164* (2022.01)
(58) Field of Classification Search
  CPC ............... H04L 63/061; H04L 63/0471; H04L 47/2475; H04L 47/35
  See application file for complete search history.

(56) References Cited

OTHER PUBLICATIONS

International Search Report dated Jul. 30, 2021 for corresponding International Application No. PCT/FR2021/050992, filed Jun. 1, 2021.
Written Opinion of the International Searching Authority dated Jul. 30, 2021 for corresponding International Application No. PCT/FR2021/050992, filed Jun. 1, 2021.
International Preliminary Report on Patentability and English translation of the Written Opinion dated Dec. 6, 2022, for corresponding International Application No. PCT/FR2021/050992, filed Jun. 1, 2021.

* cited by examiner

[Fig. 1]
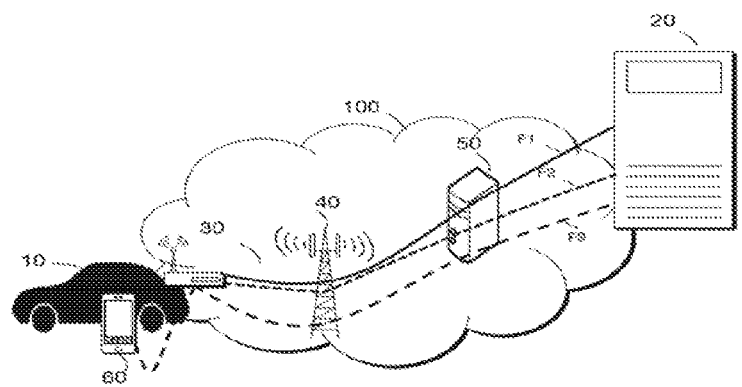
[Fig. 2]
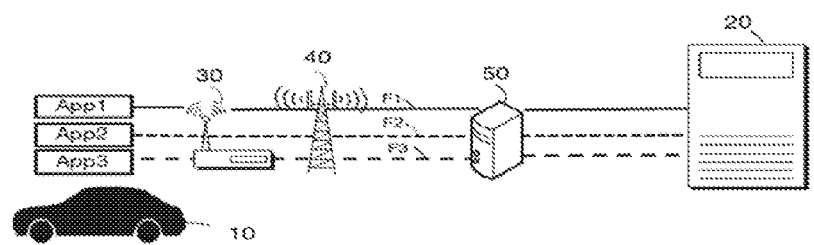

[Fig 3]
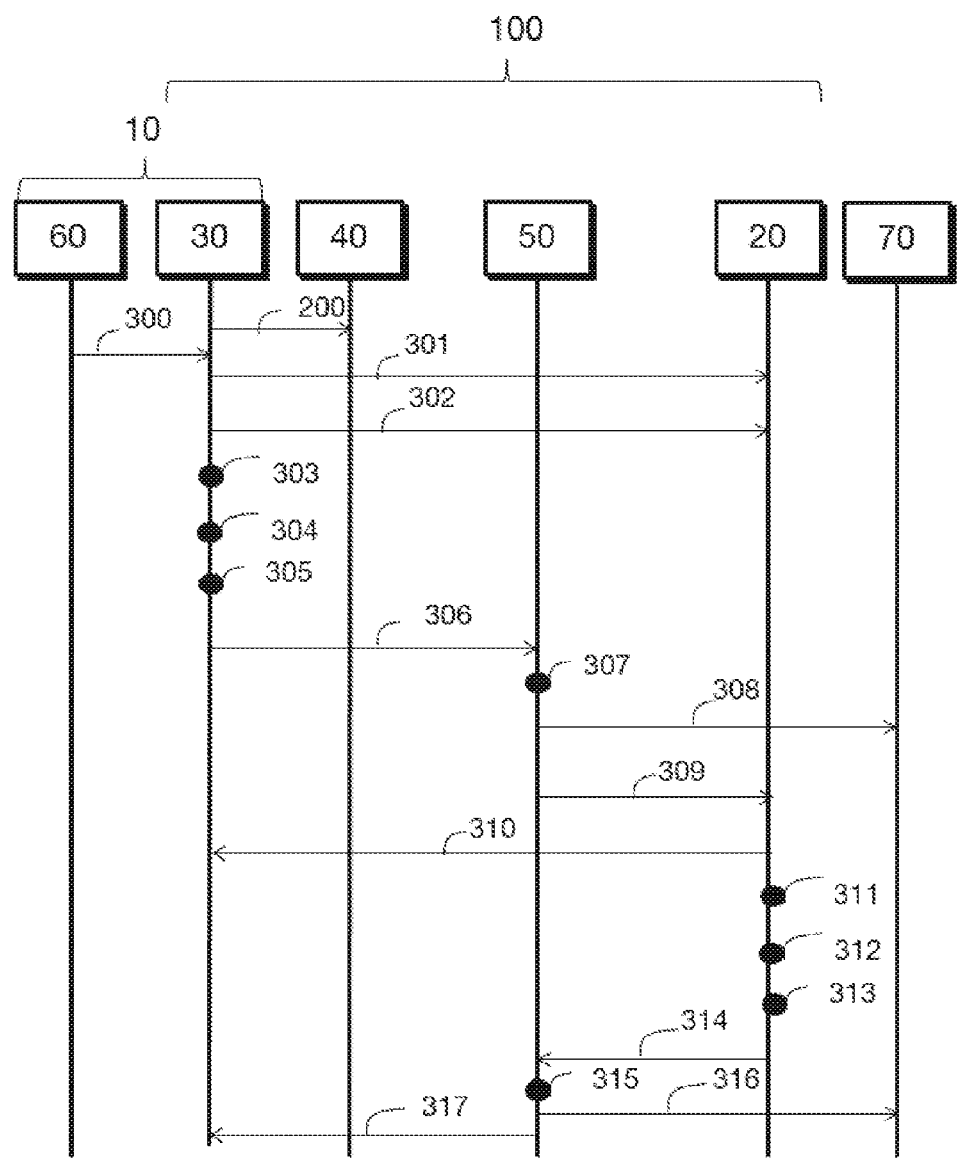

[Fig 4]
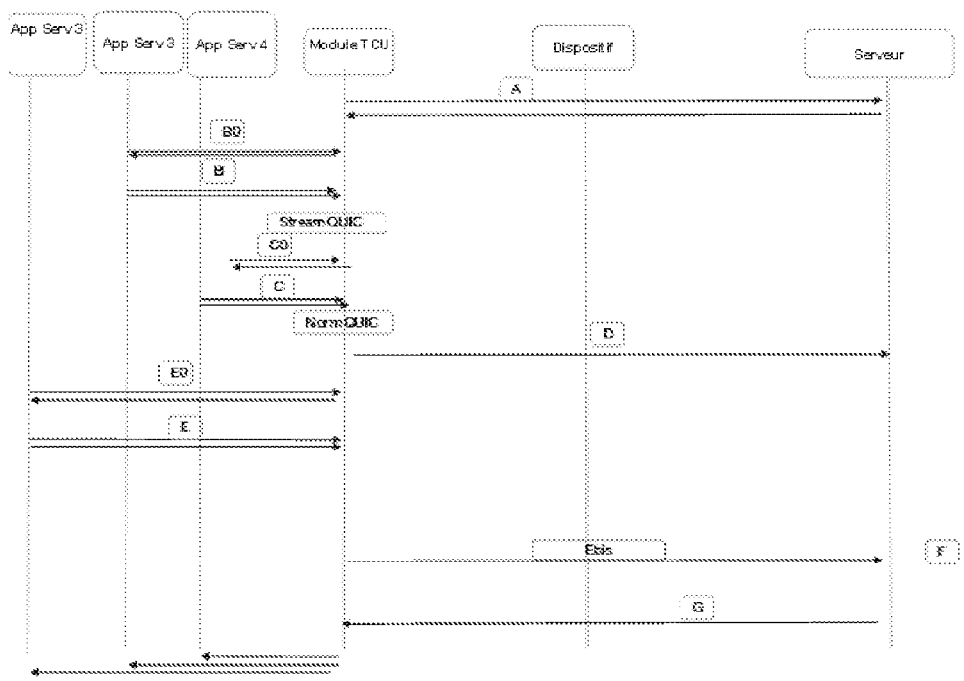

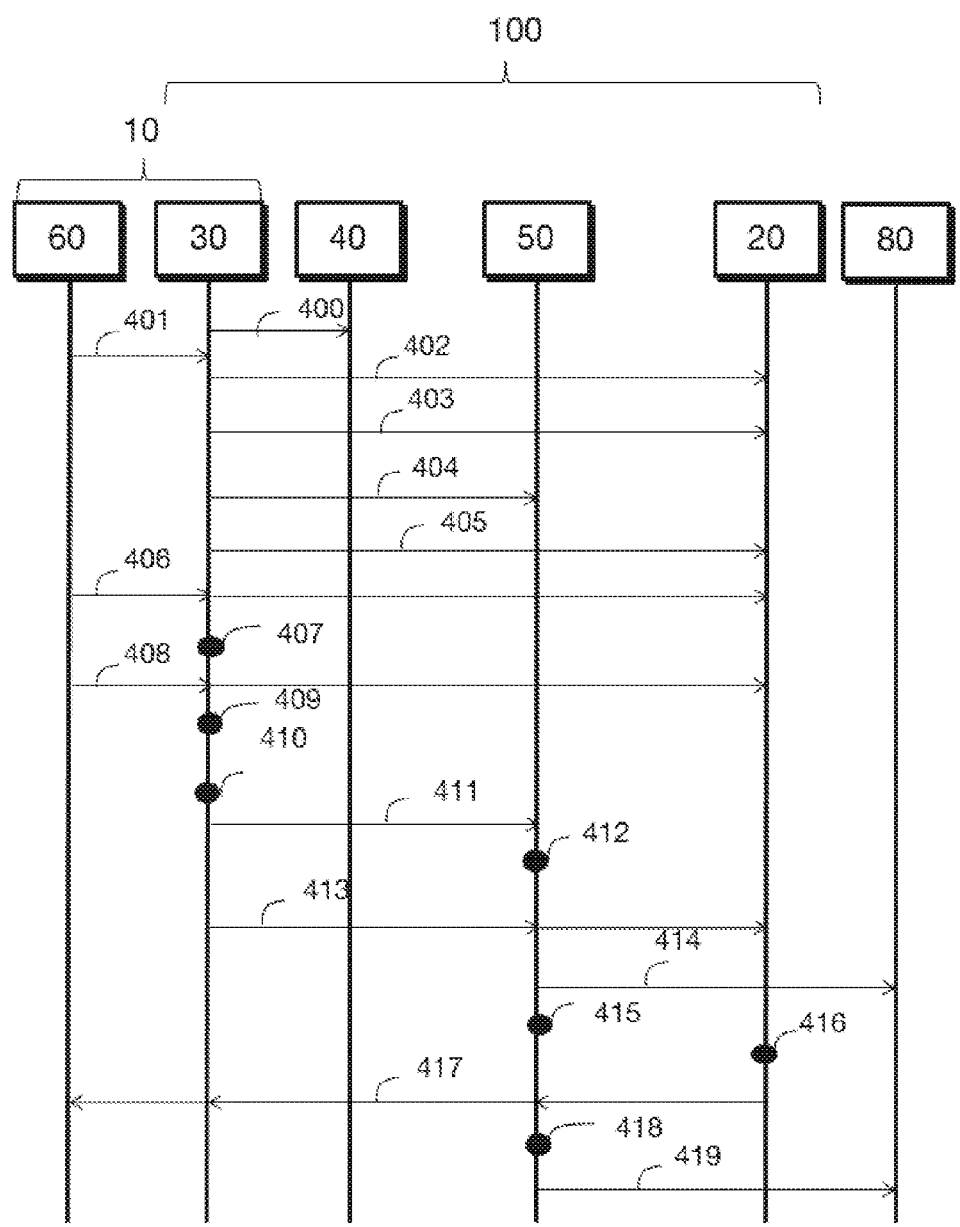
[Fig 5]

[Fig 6]
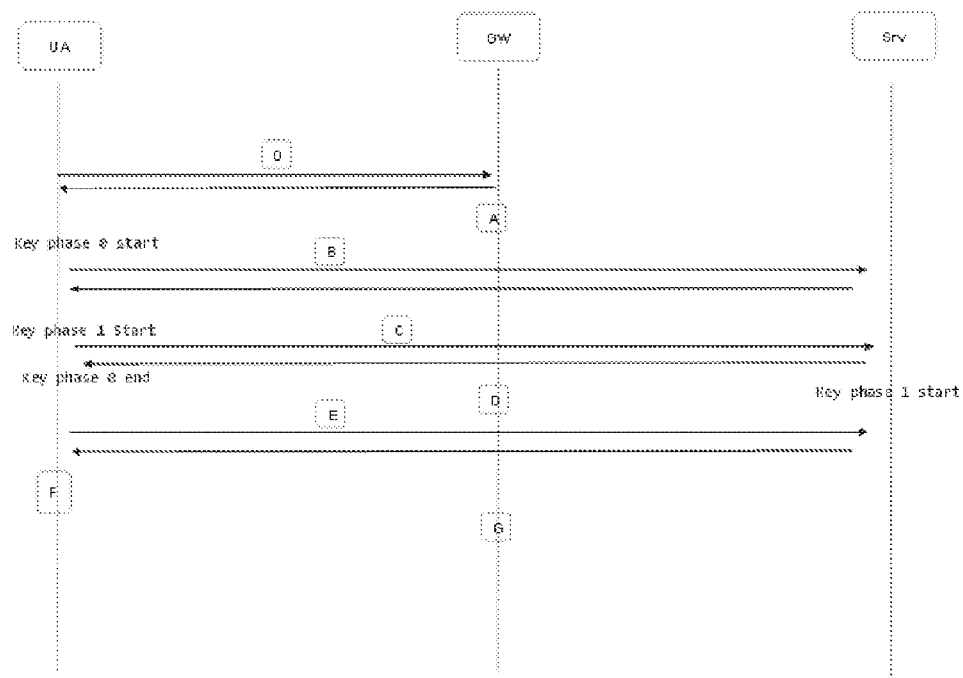

[Fig 7]
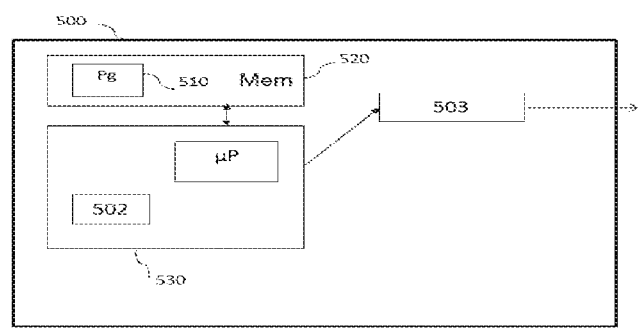
[Fig 8]
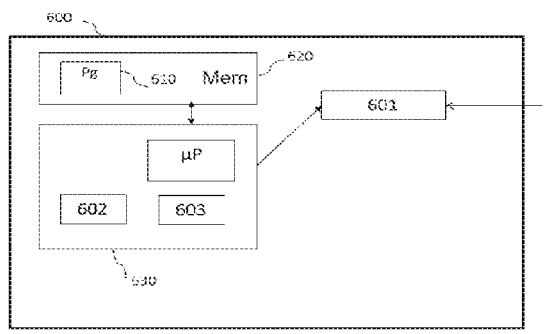

[Fig 9]
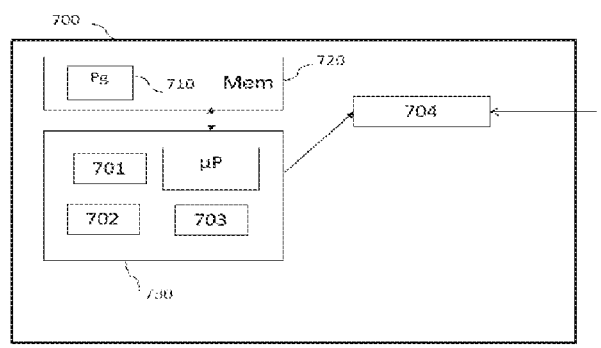
[Fig 10]
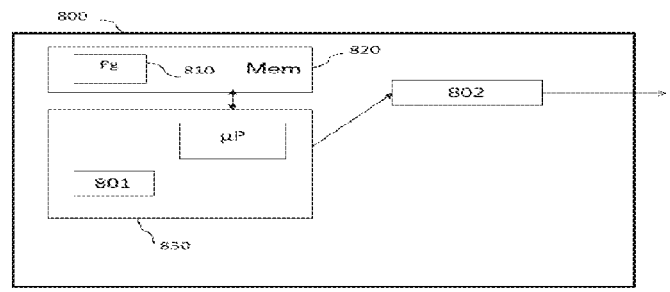

METHOD FOR CAPTURING A PACKET FROM AN ENCRYPTED SESSION

CROSS-REFERENCE TO RELATED APPLICATIONS

This Application is a Section 371 National Stage Application of International Application No. PCT/FR2021/050992, filed Jun. 1, 2021, which is incorporated by reference in its entirety and published as WO 2021/245350 A1 on Dec. 9, 2021, not in English.

1. TECHNICAL FIELD

The invention relates to transporting multiplexed data streams in a protocol, such as a transport protocol, of a communications infrastructure and aims to propose a solution to allow processing to be applied to a specific data stream from among a set of transported data streams.

2. PRIOR ART

In communications networks, data streams are increasingly routed securely, i.e., by applying authentication and confidentiality mechanisms to the data exchanged between two peers. This security is increased with the use of the HTTP/2 (Hypertext Transfer Protocol/2) protocol transported on the TLS (Transport Layer Security) and TCP (Transmission Control Protocol) protocol, then the rapid development of the QUIC (Quick UDP Internet Communications) transport protocol. This QUIC protocol is widely used by several web browsers and application servers. QUIC combines the transport, multiplexing and protection functions of RTP (Real-time Transport Protocol), MPTCP (MultiPath TCP), TCP, SCTP (Stream Control Transmission Protocol) and TLS protocols into a single protocol. It enhances security using integrated authentication and confidentiality mechanisms for the signaling data present in the header of the packets, and renews keys from the first exchanges of messages of the protocol (Handshake process). It also should be noted that the QUIC protocol is an example of a protocol with such security and multiplexing features for several data streams in a single connection, but these features also apply to other protocols. Thus, the MPTCP, HTTP3, SCTP, SPDY and HTTP2 protocols also allow several data streams to be multiplexed and therefore have constraints, as described hereafter.

An operator routing the data transported in a protocol, such as QUIC, encounters a problem, on the one hand, of identifying a stream due to the application of a security mechanism, such as encryption and, on the other hand, encounters the problem of multiplexing data streams in a single data session. This can occur, for example, within the context of the development of vehicular data services. It should be noted that an eCall service is currently being deployed in Europe. The eCall service represents an initiative of the European Commission that aims to introduce, ultimately in all vehicles sold in the European Union, an automatic emergency call system (eCall) based on a public service, allowing a car involved in an accident to instantly call the emergency services, while sending a certain amount of data, including its exact location, irrespective of the EU country where they are located. This system, which is based on the single European emergency number 112 enhanced with geolocation, will enable a faster response from emergency services, adapted to the severity of the accident and to the type of vehicle involved.

Automobile manufacturers have thus started to deploy eCall services in all new models released from April 2018 via the integration of connected units called TCUs (Telematic Control Unit) fitted with SIM cards. However, it would appear that the development of this eCall assistance service is accompanied by other services that are offered from such a TCU unit. These services can be driver assistance services, entertainment services, or even vehicle control services. The data associated with these various services require different processing by an operator. Thus, data relating to entertainment services can be billed to a client, vehicle control data can be duplicated in order to be used in the event of a problem and the assistance data can have a high priority applied thereto since they must not experience any latency when they are transmitted. This data, transmitted by the TCU unit, for example, also has the specific feature of being routed to one or more non-differentiated server(s). Indeed, it would appear that content providers or providers of data caching solutions can send or receive a plurality of types of data from among the various types of data (assistance, entertainment, control, etc.) described above. Document US 2005-0177506 A1 describes a solution for differentiating streams with a view to billing associated with each stream, yet the proposed solution is based on distinguishing the streams as a function of the IP address. This solution is not effective for the aforementioned problem since the streams are all considered by a routing equipment of an operator to be originating from a single equipment, such as the TCU unit, and therefore from a single IP address. It should be noted that the destination address also does not allow the streams to be distinguished since this address also can be common to the various multiplexed data streams if a content server or a cache server is the recipient of several distinct streams.

The aim of the present invention is to provide improvements over the prior art.

3. DISCLOSURE OF THE INVENTION

The invention improves the situation using a method for discriminating a first message relating to a first application from among a set of messages relating to a plurality of applications, transmitted by a terminal unit to a data server by means of a routing device, capable of applying a process to an attribute relating to the first message, said method being implemented by the terminal unit and comprising:
  adding an attribute relating to the first message to an information packet, said packet consolidating attributes to which the process is applied;
  applying a marking to the information packet comprising the added attribute;
  transmitting the information packet comprising the applied marking to the data server.

The method thus allows an operator administering a device, such as a router or an equipment of the DPI (Deep Packet Inspection) type or any other equipment of a communication network, to be able to identify a message from among a set of messages unambiguously and without requiring complex processes. This identification actually becomes increasingly complex, on the one hand, due to content servers consolidating a wide variety of independent services and, on the other hand, by using protocols multiplexing increasing numbers of messages from various applications or terminals, with these applications and these terminals transmitting the messages by means of a terminal unit. In this case, the identifiers, such as the IP addresses of the terminal unit and/or the data server, are not sufficient for definitively identifying a message from an application or a terminal. The method allows a terminal unit to be able to identify and consolidate certain messages, as a function of various attributes, such as the terminal that is the source of the message, the type of application or even the application used, the quality of service relating to an application, in a specific packet. The unit thus builds a packet consolidating the messages that will receive specific processing from a device of the network and applies a marking thereto, for example, by modifying a parameter for marking this message in such a way that when this marking parameter is read, the device quickly identifies this packet in order to then apply a process to the messages added to the packet by the terminal unit.

According to one aspect of the discrimination method, the terminal unit transmits the plurality of messages to the data server in a secure session between the terminal unit and the data server.

The discrimination method is of particular interest when the session between the messages exchanged between the terminal unit and the server exchanges data securely, i.e., via a connection guaranteeing the confidentiality of the messages. In this case, only the equipment holding a key for decrypting the messages can access the content of the messages. However, the method allows a terminal unit to apply a marking, for example, by modifying a marking parameter, for example, in an unencrypted part of the packet comprising the messages, so that the device can apply a process requiring neither access to the content of the packet, nor the modification of the packet.

According to another aspect of the discrimination method, the information packet is a packet of a secure stream multiplexing protocol.

Secure stream multiplexing protocols, such as QUIC, HTTP2 or HTTP3, have advantages for implementing the discrimination method. For example, the QUIC protocol has many advantages for content providers and for users, in particular for its message multiplexing capabilities and its intrinsic security of the header data. The method advantageously can be implemented by adding messages to a QUIC packet able to be processed by the device. Indeed, this protocol is more and more widely supported by the user units and the data servers and it allows multiplexing of the messages. Marking such a QUIC packet allows the device to quickly differentiate the packets to be processed from the others routed to the data server without processing.

According to another aspect of the discrimination method, the secure stream multiplexing protocol is a protocol from among the following protocols: the MPTCP protocol, the SCTP protocol, the QUIC protocol, the HTTP2 protocol, the SPDY protocol, the HTTP3 protocol.

The QUIC, HTTP2 and HTTP3 protocols are increasingly used by content providers and terminal providers for transferring data. Using one of these protocols offers the advantage of allowing this method to be able to be deployed quickly.

According to another aspect of the discrimination method, the protocol the QUIC protocol and applying the marking comprises modifying binary elements from among a "spin bit" and/or "Reserved Bits".

The spin bit is a bit of the header of the QUIC protocol. This bit particularly can be used for computing latency of a data transmission between a transmitter and a receiver. The use of this bit, which is included in the specification of the QUIC protocol, and is therefore supported by all the QUIC applications but is not necessarily used, particularly if the latency is not computed, allows the device to be able to quickly identify the QUIC packet to be processed.

The use of the two "Reserved Bits" allows the possibility of differentiating four stream management packets, thus allowing the device to be able to apply four differentiated processes to messages included in the management packets comprising these four options. The use of the "Reserved Bits" in addition to the "spin bit" authorizes the implementation of eight differentiated processes for the messages of the stream management packets. The terms Spin Bits and Reserved Bits are associated with the QUIC protocol and the use of bits with the same role can be contemplated in any secure stream multiplexing protocol.

According to another aspect of the discrimination method, the information packet comprises an attribute corresponding to a specific application.

The method can be implemented in order to apply a process to a specific application. The terminal unit thus can instantiate several stream management packets, each comprising messages relating to a specific application and for which the application of the marking, which in this case corresponds to a modified marking parameter, is specific to the stream management packet. The device can thus apply a specific process to the stream management packets as a function of the distinct parameter of each packet.

According to another aspect of the discrimination method, the terminal unit is an equipment for accessing a local network routing the plurality of messages from and to terminals of the local network.

The discrimination method advantageously can be implemented by an equipment for accessing a local network, such as an access gateway of a home network or a TCU type unit of a vehicular network. Indeed, the terminal unit can discriminate the various applications and consolidate the messages from these various applications into separate packets so that an equipment of the network routing the packet applies a specific process as a function of a marking parameter of the packet.

According to another aspect of the invention, the discrimination method comprises, prior to adding the attribute, selecting said first message as a function of one or more criteria from the following list:
  the first application is included in a list of applications managed by the terminal unit;
  the first message is received from a terminal, an identifier of which is included in a list of identifiers managed by the terminal unit;
  the first message comprises a datum relating to a quality of vice, said datum being included in a data set managed by the terminal.

The discrimination method advantageously can be implemented for a limited number of applications. For example, only the applications with data that is billed to the user are considered and the messages of these applications are added to the management packet. The method also can be instantiated for a list of terminals, whether or not this is independent of the applications used by these terminals. A datum of a message, for example, an IP address or even a field related to the Quality of Service, also can be used to decide whether or not to add the message to the management packet, whether or not this is in conjunction with the application and/or the terminal supporting the application.

The various aspects of the discrimination method that have been described above can be implemented independently of each other or in combination with each other.

The invention also relates to a method for processing an attribute relating to a first message relating to a first application, said first message being transmitted by a terminal unit to a data server, the method being implemented by a device routing the first message and capable of applying a process to an attribute relating to the first message, comprising:

detecting an information packet comprising the attribute added by the terminal unit, as a function of a marking applied to the received information packet;
  processing the attribute included in the received information packet.

The processing method allows a process to be able to be applied to a packet potentially consolidating several messages for which processing must be performed. The method thus allows a process to be applied on the basis of information present, for example, in the header of a packet. Thus, if useful data of the packet are encrypted, the device by which packets are conveyed can nevertheless apply a process relating to the quality of service, by counting some messages from among the set of messages conveyed through the device on the basis of a marking parameter of a packet consolidating the relevant messages affected by the process to be applied.

According to one aspect of the processing method, the processing comprises counting at least one datum relating to the application from the processed attribute.

In an environment where the packets can be transmitted by applications for which the streams are billed to separate entities, modifying a marking parameter of a packet comprising messages relating to applications allows these packets to be billed to a specific entity. Thus, for example, the marked packets comprise messages to be billed to a vehicle manager and are easily identifiable in order to be counted by an intermediate device.

According to one aspect of the method of the invention, the processing method further comprises receiving and applying a process relating to a second message relating to the first application, from an attribute included in a second information packet having an applied marking, said second information packet being received from the data server and being destined for the terminal.

The processing method advantageously can be implemented for the packets transmitted by the terminal unit and by the data server. For example, in the case of counting packets for billing or even for applying a process specific to the packets, the process may need to be applied to the two-way streams of the packets transmitted by the terminal unit to the server or by the data server to the terminal unit.

The various aspects of the processing method described above can be implemented independently of each other or in combination with each other.

The invention also relates to a device for discriminating a first message relating to a first application from among a set of messages relating to a plurality of applications, transmitted by a terminal unit to a data server by means of a routing device, capable of applying a process to an attribute relating to the first message, said device comprising:

a marking module, capable of:
  adding an attribute relating to the first message to an information packet, said packet consolidating attributes to which the process is applied;
  applying a marking of the information packet comprising the added attribute;
  a transmitter, capable of transmitting the information packet comprising the applied marking to the data server.

This device, which is capable of implementing all the embodiments of the discrimination method described above, is intended to be implemented in a device of a communication network, such as an equipment for accessing a local network, such as a home gateway, a terminal or a router-type unit.

The invention also relates to a device for processing an attribute relating to a first message relating to a first application, with said first message being transmitted by a terminal unit to a data server, capable of applying a process to an attribute relating to the first message, comprising:

a detector, capable of detecting an information packet comprising the attribute added by the terminal unit, as a function of a marking applied to the received information packet;
  a processing module, capable of processing the attribute included in the received information packet.

This device, which is capable of implementing all the embodiments of the processing method described above, is intended to be implemented in a device of a communication network such as a router, a firewall, a stream inspection equipment (Deep Packet Inspection), or even a data server. The invention further relates to a system for processing an attribute relating to a first message relating to a first application, said first message being transmitted by a terminal unit to a data server, comprising at least one discrimination device, and at least one processing device.

The invention also relates to computer programs comprising instructions for implementing the steps of the respective discrimination and processing methods described above, when these programs are both executed by a processor, and a recording medium respectively readable by a discrimination and processing device on which the computer programs are recorded.

The invention also improves the situation by means of a method for capturing a packet from an encrypted session established between a terminal unit and a data server, said packet comprising a datum for determining a security key used for encrypting the packet, the method being implemented by a device routing the packet between the terminal unit and the data server and comprising:

analyzing a plurality of packets transmitted by the terminal unit and destined for the server;
  identifying a cooperation packet from among the plurality of analyzed packets, said cooperation packet comprising the determining datum corresponding to a security key used for encrypting packets transmitted by the terminal unit to the data server prior to the terminal unit sending said cooperation packet;
  decrypting the received cooperation packet using a security key corresponding to the determining datum of the identified cooperation packet.

When a connection between a terminal unit and a data server is secured, and in particular encrypted, a device for routing data cannot access the content of the packets exchanged between the unit and the server. One option for correcting this is to provide the device with the security keys used by the terminal unit and the data server. However, this provision results in a security fault being caused in the data exchanges and requires systematically transmitting the keys to the device, which represents a security problem. However, in some cases, the device must be able to apply a specific process to certain packets, with this processing involving specifically billing certain applications or transmitting certain data to a regulatory body. The method thus allows, from among all the packets routed by the device, the terminal unit to be able to insert a cooperation packet and to indicate, by means of a determining datum present in the packet, for example, one or more bits set to a certain value identifiable by the device, typically in the header of the packet, that this packet is a cooperation packet to be decrypted with a key that is determined by the determining datum with a certain value. The method thus advantageously allows a collaboration to be implemented between the terminal unit and the device routing the data in order to allow the device to apply a process to cooperation data transmitted by the terminal unit. The method also allows a security key to be reused, which key is no longer used for transporting the data between the terminal unit and the data server, for the collaboration between the terminal unit and the device. The device can be a router, a firewall equipment or any other equipment providing data processing for the session. In particular, the data server can implement the actions described for the device. In this case, the data server receives the cooperation packet and processes it using the security key corresponding to the determining datum. Encryption and decryption includes all the data protection modes that can be used to guarantee the confidentiality of the exchanged packets, and in particular quantum or homographic security techniques.

According to one aspect of the capturing method, the determining datum is a binary phase element indicating a key change to be used by the terminal and the data server for encrypting and decrypting packets exchanged between the terminal unit and the data server.

It is known that a phase bit is used, for example, in protocols so that one end of the session notifies the other end of a change in the security key for the data exchanged thereafter. In the case whereby such a bit was set to 0 and that one end, such as the terminal unit, shifts it to 1 for the data transmitted from this moment to the data server, the data server will decrypt the received data with the key corresponding to bit 1, corresponding to a phase change. In this case, the key corresponding to bit 0 is no longer used for encrypting and decrypting the data exchanged between the terminal unit and the data server and can be used for encrypting the cooperation packet transmitted to the device by e terminal unit, in accordance with the binary phase element.

According to one aspect of the capturing method, the cooperation packet is a packet of a secure data multiplexing protocol, such as the QUIC protocol, and the cooperation packet is identified from one or more of the following parameter(s):
phase bit;
value of the spin bit of the QUIC packet;
value of the RR bits of the QUIC packet;
connection identifier.

The terminal unit can transmit various information to the device, possibly by encrypting the various information with the security key associated with the value of the binary determining element. The use of a connection identifier previously negotiated between the terminal unit and the device, for example, when exchanging an encryption/decryption key or by exchanging specific messages, is advantageous. This actually allows the two equipments, namely the terminal unit and the device, to be aware of this information. The use of the spin bit and/or of the RR bits of the QUIC packet can replace the connection identifier that is used or can even supplement it in order to enhance the signaling transmitted to the device and to explicitly notify it that it is a cooperation packet requiring processing by the device.

According to one aspect of the capturing method, the cooperation packet is identified after activating, in the device, the detection of the packets for which the determining datum has a value that differs from the determining datum of a plurality of successive packets previously received from the terminal unit.

The device can continuously activate the detection of the reception of cooperation packets or it can even activate this detection as a function of an event, thus reducing the requirement for the device to use resources for activating and processing the packet following the detection of a packet with the binary determining element set to 0. The activation can be implemented after the device receives an activation message transmitted by the terminal unit, thus notifying the device that it will receive a cooperation packet in the subsequent seconds. The activation also can be implemented if the device successively receives several packets with the determining datum set to a certain value, for example, set to 1, thus notifying the device that the encryption key corresponding to the value 0 is no longer used for encrypting the data transmitted to the data server but can be used for sending a cooperation packet, allowing an obsolete decryption key to be reused for encrypting data to the data server. Thus, after receiving several successive packets with a value of the determining datum set to 1, for example, receiving a packet with a value set to 0 can notify the device that it is a cooperation packet.

According to one aspect of the capturing method, the security key associated h the determining datum is transmitted by the terminal unit to the device after the end of the session between the terminal unit and the data server.

According to this embodiment, the security key corresponding, for example, to binary determining element is transmitted after the cooperation packet is sent by the terminal unit and after the end of the session between the terminal unit and the data server. This ensures that the security key cannot be used for another use, for example, for decrypting a transmitted data packet while the session is still established. The device saves the cooperation packet and decrypts it using the transmitted key once the session is completed using the encryption key transmitted by the terminal unit after the session is closed.

According to one aspect of the capturing method, the security key associated the determining datum was used for securing an exchange of packets from a previous session between the terminal unit and the data server.

Some protocols, such as QUIC or TLS, make provision for changing the encryption keys used to encrypt the data exchanged during sessions at certain times. The terminal unit and the data server thus derive, for example, an encryption key for the new exchanges based on a key previously used for exchanges of a previous session. The key used for the exchanges of a previous session is thus no longer used to derive keys for subsequent data exchanges and advantageously can be used for encrypting and sending the cooperation packet transmitted by the terminal unit to the device.

According to one aspect of the capturing method, the security key associated with the determining datum is a key negotiated between the terminal unit and the data server during a step of initializing the session.

During a phase of establishing a session, such as a Handshake phase, a security key, also called "secret cooperation", can be negotiated by the terminal unit and the data server. This is particularly the case when no session existed between the terminal unit and the data server before this session was established. This security key (which can be a secret cooperation) advantageously can be used for encrypting and decrypting the cooperation packet.

According to one aspect of the capturing method, the cooperation packet is removed from the plurality of packets when routing said plurality to the data server.

In one embodiment, the cooperation packet is removed from a plurality of packets sent by the terminal unit in the session established with the data server. In particular, in the case of a one-way session between the terminal unit and the data server, the cooperation packet intended for the device is of no interest to the data server. Its removal can also avoid a malfunction of the data server, which is not meant to receive a packet comprising a binary determining element corresponding to an encryption key that is normally no longer used for encrypting packets between the terminal unit and the data server.

According to one aspect of the method of the invention, the capturing method further comprises analyzing, as well as identifying a cooperation packet, and decrypting the cooperation packet as defined above, from among packets transmitted by the data server to the terminal unit.

In particular, in the case of a two-way session between the terminal unit and the data server, the device can apply a process, for example, a counting operation, for the packets received from the terminal unit, but also from the data server. In this case, the method that is implemented will be identical to the method applied for the packets received from the terminal unit and the device also may not remove the cooperation packet from the packets transmitted to the data server, so that said server takes into account the existence of the cooperation packet in order to set itself a binary element of the cooperation packet transmitted to the device.

The various aspects of the capturing method described above can be implemented independently of each other or in combination with each other.

The invention also relaxes to a method for counting data relating to an application transmitted by a terminal unit to a data server by means of a device, using an encrypted session between the terminal unit and the server, the method being implemented by the terminal unit and comprising:

transmitting a plurality of packets, each comprising a datum for determining a security key used for encrypting the packet;

incrementing a counter of the application-related data, for example, sent to the data server;

adding the incremented counter to a cooperation packet comprising the determining datum corresponding to a security key used for encrypting packets of the plurality of packets exchanged between the terminal unit and the data server prior to sending said cooperation packet;

sending the cooperation packet comprising the added counter to the data server.

The counting method implemented by the terminal unit allows the device to have information relating to the amount of data that is exchanged, in a one-way or two-way link between the terminal unit and the data server, for a given application. This method thus allows the problem to be addressed of the device accessing the encrypted data of the packets. This method thus allows the user to securely transmit, by possibly reusing a security key previously used for the packets of the session, counting information to the device via a counter incremented for each packet relating to a given application. Thus, the device can then apply a process, such as billing, to the entities responsible for the payment for the packets of the respective applications transmitted and possibly received by the terminal unit.

According to one aspect of the invention, the counting method further comprises sending the device a security key corresponding to the determining datum of the cooperation packet.

Since the security key corresponding to the binary determining element in most cases is not known by the device, the terminal unit can transmit this key, for example, once the session between the terminal unit and the data server ends, so that the device can effectively access the content of the cooperation packet.

According to one aspect of the invention, the counting method further comprises the device previously sending a message for activating the capturing method to the data server.

In particular, when the session between the terminal unit and the data server is two-way, the terminal unit may need to transmit a message for activating the capturing method to the data server, thus notifying the data server that it is likely to receive a packet comprising a binary element corresponding to a security key that is no longer used. This activation message can also notify the data server that it activates the counting method itself that corresponds to the marking method implemented by the terminal unit for the packets that it sends to the terminal unit.

The various aspects of the counting method scribed above can be implemented independently of each other or in combination with each other.

The invention further relates to a device for capturing a packet from an encrypted session established between a terminal unit and a data server, said packet comprising a datum for determining a security key used for encrypting the packet, comprising:

an analyzer, capable of analyzing a plurality of packets transmitted by the terminal unit and destined for the server:

an identification module, capable of identifying a cooperation packet from among the plurality of analyzed packets, said cooperation packet comprising the determining datum corresponding to a security key used for encrypting packets transmitted by the terminal unit to the data server prior to the terminal unit sending said cooperation packet;

a decryption module, capable of decrypting the received cooperation packet using a security key corresponding to the determining datum of the identified cooperation packet.

This device, which is capable of implementing all the embodiments of the capturing method described above, is intended to be implemented in a device of communication network, such as a router, a firewall, a stream inspection equipment (Deep Packet Inspection), or even a data server.

The invention further relates to a device for counting application-related data transmitted by a terminal unit to a data server by means of a device, using an encrypted session between the terminal unit and the server, comprising:

a transmitter, capable of transmitting a plurality of packets, each comprising a datum for determining a security key used for encrypting the packet;

a computer, capable of incrementing a counter of the application-related data, and capable of adding the incremented counter to a cooperation packet comprising the determining datum corresponding to a security key used for encrypting packets of the plurality of packets exchanged between the terminal unit and the data server prior to sending said cooperation packet;

a transmitter, capable of transmitting the cooperation packet comprising the added counter to the data server.

This device, which is capable of implementing all the embodiments of the counting method described above, is intended to be implemented in a device of a communication network, such as an equipment for accessing a local network, such as a home gateway, a terminal or a router-type equipment.

The invention further relates to a system for counting application-related data transmitted by a terminal unit to a data server by means of a device, using an encrypted session between the terminal unit and the server comprising at least one capturing device and at least one counting device.

The invention also relates to computer programs comprising instructions for implementing the steps of the respective capturing and counting methods described above, when these programs are both executed by a processor and a recording medium, respectively readable by a capturing and counting device, on which the computer programs are recorded.

The aforementioned programs can use any programming language, and can be in the form of source code, object code, or of intermediate code between source code and object code, such as in a partially compiled format, or in any other desirable format.

The aforementioned information media can be any entity or device capable of storing the program. For example, a medium can comprise a storage means, such as a ROM, for example, a CD-ROM or a microelectronic circuit ROM, or even a magnetic recording means.

Such a storage means can be, for example, a hard disk, a flash memory, etc. Moreover, an information medium can be a transmissible medium such as an electrical or optical signal, which can be routed via an electrical or optical cable, by radio or by other means. A program according to the invention particularly can be downloaded over an Internet type network.

Alternatively, an information medium can be an integrated circuit, in which a program is incorporated, with the circuit being adapted to execute or to be used to execute the relevant methods.

4. BRIEF DESCRIPTION OF THE DRAWINGS

Further features and advantages of the invention will become more clearly apparent upon reading the following description of particular embodiments, which are provided by way of simple illustrative and non-limiting examples, and the accompanying drawings, in which:

FIG. 1 shows an implementation of the discrimination method according to a first aspect of the invention;

FIG. 2 shows an implementation of the method for capturing a packet according to one embodiment of the invention;

FIG. 3 shows an implementation of the discrimination method according to one embodiment of the invention;

FIG. 4 shows an implementation of the discrimination method according to another embodiment of the invention;

FIG. 5 shows an implementation of the counting method according to one embodiment of the invention;

FIG. 6 shows an implementation of the counting method according to another embodiment of the invention;

FIG. 7 shows a discrimination device according to one embodiment of the invention;

FIG. 8 shows a processing device according to one embodiment of the invention;

FIG. 9 shows a capturing device according to one embodiment of the invention;

FIG. 10 shows a counting device according to one embodiment of the invention.

DESCRIPTION OF THE EMBODIMENTS

Throughout the remainder of the description, embodiments of the invention are presented in a communication infrastructure. This infrastructure can be implemented in order to route communications data to fixed or mobile terminals, and the infrastructure, deployed from specific equipments or virtualized functions, can be intended to route and process data from residential or business customers.

FIG. 1, which shows an implementation of a discrimination method according to a first aspect of the invention, will be referred to in the first instance. According to this first aspect, a terminal unit 30 transmits several messages F1, F2, F3 to a data server 20. These messages F1, F2, F3 are routed in a network 100 particularly comprising an access equipment 40 and a device 50 routing the messages exchanged between the terminal unit 30 and the data server 20. The messages F1, F2, F3 transmitted by the terminal unit 20 can be transmitted by the terminal unit 30 or even transmitted by another terminal, such as the terminal 60, and routed by the terminal unit 30 to the data server 20 via the access equipment 40 connecting the terminal unit 30 to the network 100 and the device 50. According to this aspect, the terminal unit 30 is a TCU type unit of a vehicle 10 transmitting the messages F1 and F2 and the terminal 60 is, for example, a smartphone of an occupant of the vehicle transmitting the messages F3. The various messages F1, F2, F3 can require particular processing by the device 50 and therefore the possibility of being able to discriminate the various messages. For example, knowing that the transmission of the messages F1, F2, F3 can be billed to separate entities, the number of messages F1 and/or F2 and/or F3 needs to be able to be effectively counted. However, according to the techniques of the prior art, it can be difficult for the device 50 to access the content of the messages F1, F2, F3 since they can be encrypted in particular. According to this aspect, knowing that the messages F3 must be billed to the occupant of the vehicle 10, the messages F3 relating to an application used by the occupant are integrated in an information packet and transmitted by the TCU 30 to the data server. In order for the device 50 to be able to easily identify the information packet, the terminal unit applies a marking, for example, by modifying information elements of the unencrypted header of the packet, so that the device 40 can easily identify and process it from among the various messages F1, F2, F3 it has to route. The added message F3 can correspond to the data of the application or even to data specific to the processing by the device 50. For example, the message F3 can correspond to the amount of data exchanged between the terminal 60 and the data server 20. Thus, the terminal unit 30, which can effectively intervene on the messages it transmits itself or on behalf of terminals such as the terminal 60, collaborates with the device by transmitting information packets thereto that can be processed by the device 50. The access equipment 40 can also act as the device 50 and the terminal unit 30 also can be a residential gateway, also called box, or even a smartphone type unit. The information packet comprising the messages F3 also can be encrypted using an encryption key and the device 50 can then decrypt the information packet received from the terminal unit 30 using a decryption key corresponding to the encryption key used for the encryption. It should be noted that if messages relating to separate applications require processing by the device 50, then the terminal unit 30 can include the messages relating to the two applications in the information packet, by differentiating, for example, the various messages using the marking applied to the packet. Thus, the marking can comprise a marking specific to an application. For example, if messages F4, not shown in FIG. 1 are transmitted by the terminal 60 to the data server 20, the terminal unit can insert the messages F3 and F4 into an information packet that the device 50 can process in accordance with the marking applied by the user unit 30.

With reference to FIG. 2, an implementation of a method for capturing a packet according to one embodiment of the invention is shown. The entities 10, 20, 30, 40, 50 shown in FIG. 2 are identical to the entities 10, 20, 30, 40, 50 shown in FIG. 1. In FIG. 2 three applications App1, App2, App3 are shown. These applications App1, App2, App3 can be used or activated on the terminal unit 30 or on a terminal, such as the terminal 60 shown in FIG. 1. The device 50, like the access equipment 40, routes the packets relating to the applications App1, App2, App3 transmitted by the terminal unit 30 to the data server 20, as well as the packets transmitted by the data server 20 to the terminal unit 30. An encrypted session is established between the terminal unit 30 and the data server 20 for routing the packets. One or more encrypted session(s), for example, one per application App1, App2 and App3 or one session for all the applications App1, App2 and App3, can be implemented. The packets exchanged between the terminal unit 30 and the data server 20 comprise a datum for determining a security key used for encrypting the packets. For example, it can involve one or more bit(s) allowing the terminal unit 30 and the data server 20 to agree on the security key to be used for encrypting and decrypting the data and to indicate the key or a key change using information provided by a determining datum, for example, present in the unencrypted header of the packet. The device 50, routing the various packets exchanged between the terminal unit 30 and the data server 20, analyzes these packets, and more specifically analyzes the data for determining the keys of the packets. A series of packets relating to the application App1 is encrypted with an encryption key, for example, a private key, and the determining datum corresponding to this key assumes a value v1. The device 50, analyzing these data and checking that the value of the datum is unchanged, transmits these packets to the data server. Then, the device receives a packet with a determining datum assuming a value v0 that had been used for exchanging packets of a previous connection of the session or for sending packets during a previous protection phase for the same connection. This value v0 of the determining datum is no longer meant to be used for exchanging packets between the terminal unit 30 and the data server, since all the packets include the value v1 as the determining datum. The device 50 determines that it is a cooperation packet, comprising data that is intended for the device, and decrypts the content of the packet with a decryption key corresponding to the value v0, with this key no longer being used for exchanging data between the terminal unit 30 and the data server 20. Thus, an encryption key previously used for exchanging packets between the terminal unit 30 and the data server 20 can be reused to transmit information to the device 50 in a packet encrypted with the reused key. This does not alter the end-to-end security between the terminal unit 30 and the data server 20, since the key used for encrypting the cooperation packet transmitted by the terminal unit 30 (or the data server 20) to the device 50 is a key that is no longer used for encrypting packets exchanged between the terminal unit 30 and the data server 20. The security key associated with the determining datum with a value of v0 can be made available to the device 50 before or after sending the cooperation packet, with the device 50 being able to store the cooperation packet in order to decrypt it once the key is received. The user unit thus can implement a counting method for notifying the device 50 about the number of packets or the amount of data or information about a session duration in a cooperation packet comprising a counter incremented for each transmitted packet, with the counter being able to correspond to the number of transmitted packets, to an amount of data incremented for each transmitted packet, or to an incremented duration as soon as a new packet is transmitted. The device 50 thus can exploit the counter information that is included in the decrypted cooperation packet using the key corresponding to the datum for determining the cooperation packet.

Reference will now be made to FIG. 3, which shows an implementation of the discrimination method according to one embodiment of the invention. The entities 10, 20, 30, 40, 50, 60 and 100 are equivalent to the entities with the same reference signs in FIG. 1 and FIG. 2. In particular, according to an alternative, the terminal unit 30 is an equipment for accessing a local network, such as a residential gateway or an equipment for accessing a vehicular network, such as a TCU. During a step 200, the terminal unit 30 attaches and connects to the access equipment 40. A session is considered to be established between the terminal unit 30 and the data server 20. According to an alternative, the session can be established by a secure connection between the terminal unit 30 and the data server 20. During a step 300, the smartphone 60 sends a message relating to an application App1, for example, a network game, and intended for the data server 20, to the terminal unit 30 and said terminal unit transmits this message to the data server 20 during a step 301. During a step 302, the terminal unit 30 transmits a message relating to an application App2, for example, for managing the vehicle 10, to the data server 20. The 2 messages require different processing by the routing device 50, with the message relating to the application App2 having to be saved by the device 50, in particular in case of an insurance audit. The access equipment 40 and the device 50 route the various messages sent during steps 301 and 302 to the data server 20. The terminal unit 30 holds a list of applications for which a particular action is to be conducted. For example, for the application App2 it must send a message related to this application to the device 50. According to another example, the terminal unit 30 identifies the messages as a function of the terminal transmitting these messages or even as a function of information, for example, relating to the quality of service, in the message itself. According to this example, the terminal unit must copy an attribute relating to the message to an information packet destined for the device 50.

According to one example, during an optional step 303, the terminal unit 30 selects a message from among the set of messages to be transmitted to the data server 20 as a function of a criterion. For example, the terminal unit can compare the relevant application with the transmitted message. According to the example, retaining the messages relating to the application App2 must result in specific processing by the device 50. According to another example, the terminal unit 30 can transmit attributes to the device 50 relating to messages sent by one terminal in particular, for example, from the terminal 60. In yet another example, the terminal unit 30 can transmit attributes relating to messages comprising specific routing, protocol or even quality of service or security information. Thus, all the messages that require a specific routing quality will be able to result in the provision of an attribute relating to the time when the terminal unit 30 sent the messages, so that the device 50 can check that the relevant messages have been properly routed in accordance with the quality of service criterion indicated in the messages, or even that their time distribution corresponds to the type of expected application (using a Shallow Packet Inspection technique).

During a step 304, the terminal unit 30 adds the message, according to one example, to an information packet. Several distinct message attributes can be consolidated in the information packet in order to limit number of transmitted information packets. According to an alternative, the attribute relating to the message, which has been added, can correspond to part of the transmitted message or even to one or more information items relating to the application App2, such as: the number of messages, the duration of the session between the terminal unit 30 and the data server 20 for the application App2, the identifier of the terminal that transmitted the messages relating to the application App2.

The information packet, according to an alternative, can comprise attributes of messages specific to a single application, for example, whether the information packet only comprises attributes relating to the application App2. However, in the case whereby the same process must be applied to messages from different applications, it can be advantageous for the attributes of messages relating to separate applications but requiring identical processing by the device to be consolidated in the same information packet. For example, if the processing involves counting the packets that are sent and that relate to two applications App4 and App5, billed to the same entity, attributes such as message counters relating to applications App4 and App5 can be transmitted in an information packet. The terminal unit 30 then applies, during a step 305, a marking to the information packet, for example, by setting certain binary elements of the information packet to a defined value. According to one example, the information packet can be a packet of a secure stream multiplexing protocol. This type of protocol, offering integrated security and the possibility of multiplexing several streams, is particularly interesting. Indeed, in the case whereby the terminal unit 30 wishes to transmit several information packets, with each packet consolidating attributes of messages requiring specific processing, the information packets then can be transmitted securely and by multiplexing the different information packets within a single connection between the terminal unit 30 and the device 50. According to one example, the secure stream multiplexing protocol can be the QUIC protocol or even the HTTP2 or HTTP3 protocol. In particular, the QUIC protocol has the advantage of including the Spin Bits and Reserved Bits that can be used to apply a marking to the information packet. Binary elements of other secure stream multiplexing protocols, such as the Spin Bit or the Reserved Bits of the QUIC protocol, can be used interchangeably to apply a marking to the information packet.

During a step 306, the terminal unit 30 sends the information packet comprising one or more attribute(s) of the messages relating to the application App2. In this embodiment, the information packet is considered to comprise the messages transmitted by the terminal unit 30 for a duration of 300 seconds. This information packet transmitted using the QUIC protocol further comprises the Spin Bits and Reserved Bits set to 1. The marking information, allowing the received information packet to be differentiated from other packets, notifies the device 50 that it is an information packet and that processing must be applied to the information packet using the attributes of messages present in the information packet received during step 306. During a step 307, the device 50 transmits a message to a backup entity 70, which message comprises the attributes of messages received during step 307 and thus allows a log to be maintained of the messages relating to the application App2 transmitted by the terminal unit 30. According to an alternative, the information packet is transmitted to the data server 20 during a step 309. This particularly can be the case when the processing by the device 50 involves duplicating the received information packet so that the sequencing of the packets received by the data server 20 is not distorted or mistaken due to the removal of a packet from a session between the terminal unit 30 and the data server 20. According to an alternative, the processing can involve counting the number of messages transmitted for an application. Thus, in the event of differentiating the billing per user (owner of the vehicle 10, holder of the terminal 60, manager of the user unit 30), the messages or the amount of data generated by the applications needs to be counted and the charges associated with the number or the amount needs to be passed on to the user or manager using or managing the application. In this case, the attribute can be a number of messages or an amount of data of the sent messages.

According to another example, the device 50 can also apply a process to the messages relating to the application App2 transmitted by the data server 20 to the terminal unit 30. According to this example, during a step 310, the data server 20 sends messages relating to the application App2 to the terminal unit 30. The steps 311 to 317 are equivalent to steps 303 to 309 described above, except that the data server 20 performs the operations of the terminal unit 30 and, reciprocally, the terminal unit 30 performs the operations performed by the data server 20.

It should be noted that be access equipment 40 can also perform some or all the operations carried out by the device 50, in addition or not in addition to the operations performed by the device 50.

With reference to FIG. 4, an implementation of the discrimination method according to another embodiment of the invention is shown.

The discrimination method and the corresponding processing method activate an extension QFLOW_A of QUIC that forces the exchanges of QUIC packets in the "stream management mode" only for the QUIC packets to be counted as being traffic to be billed to the owner of the SIM card of the TCU module (terminal unit) of a car: consolidating the QUIC messages to be counted in marked QUIC packets. The extension QFLOW_A modifies the use of the spin bit field for marking the packets QUIC, to be counted by the device.

Furthermore, according to an alternative, on the server, activating the extension QFLOW_A creates a stream table in the server that is used to implement the "stream management" method for the packets sent by the server.

The manufacturer of the vehicle typically develops the OEM (Original Equipment Manufacturer) method in the tablet of the dashboard so that the OS (Operating System), the web browser or the applications consolidate the QUIC messages of the streams to be counted in marked QUIC packets so that the device, which, for example, is managed by a mobile operator, identifies and counts them in the case whereby the processing involves counting the messages of the relevant streams. The QFLOW_A method is described in "stream management" mode: the criterion for consolidating messages into marked packets is the identifier of the application that generated the messages in marked packets. It can be generalized for other consolidating modes: for example, another criterion for consolidating messages can involve consolidating QUIC control messages so as to count and be able to only bill "useful" data messages (i.e., not comprising the DNS control data, for example) to the end client. Other processes can involve monitoring the signaling for security reasons or for faster routing of the control messages in a device such as a proxy. Typical use of the method involves storing the signaling in order to perform a subsequent inspection of the messages stored and transmitted in QUIC packets.

The method is applicable to a mode without marking that is visible from outside the packet. Typical use of this mode is the acceleration of the signaling in devices of the "reverse proxy" type, where the signaling is routed to a DPI-type inspection function (range-finding, analysis of problems, security, etc.).

The discrimination method can include various modes that can be combined, such as, for example:
  the QFLOW_A mode: only the messages sent by the client TCU (terminal unit) are added to a QUIC packet that is marked, therefore only the sent data are counted as traffic billed by the manufacturer;
  the QFLOW_B mode: a QUIC extension indicates, in the transport parameter called "spin bit", that the packet must be counted. Counting the amount paid by the manufacturer is sufficient (which must not be billed to the owner of the car);
  QFLOW_C: a QUIC extension indicates, in a transport parameter, that the spin bit and the 2 RR bits of the QUIC protocol are used to describe the identifier of an application. Thus, 3 bits allow 8 different applications (for example, waze, gmap, etc.) or another consolidating criterion (identifier of the terminal, QoS criterion, etc.) to be distinguished.

The steps of the method in this embodiment proposed in FIG. 5 are as follows:
  Step A: creating the QUIC connection between the TCU module (terminal unit) and the server (data server) without explicitly activating the QFLOW_A extension: the server thus deduces that the spin bit of the QUIC protocol is used for the QFLOW_A mode;
  Steps B0 (and E0): the TCU module receives messages from the application App Serv 3 of a terminal. The TCU module knows (for example, by virtue of a table of applications to be billed) that these messages are to be counted. The TCU module therefore receives data to be counted by the device. It creates a QUIC packet that consolidates the data to be counted by the device. It can structure these data per application in the case whereby the QUIC packet comprises data from several distinct applications;
  Step B: the TCU module (and more specifically the QUIC stack of the module) receives data (messages) to be counted and added to a QUIC stream management packet (Stream). The QUIC stack can include the received message or only part of the message, such as the source and destination addresses, the protocol type;
  Step C0: the TCU module receives messages relating to the application App Serv 4 that are not to be counted by the device. An unmarked QUIC message (QUIC standard) is created and these messages are routed to the server, which is the recipient of this data;
  Step C (and step E): the QUIC stack receives data (or messages) and processes them in order to include them in the QUIC packet created during step C0. It sends the "unmarked" QUIC packet to the server;
  Step D: the server receives "unmarked" QUIC packets, i.e., with a Spin Bit value set to 0. It should be noted that the device does not apply any processing to these "unmarked" packets;
  Step E: another terminal sends messages relating to the application App Serv 3. These messages are to be counted as indicated in step B0. When the marked QUIC packet comprises a sufficient amount of messages and/or after a certain delay following the creation of a Stream packet, the TCI module transmits the QUIC Stream packet to the server;
  Step Ebis: the device identifies the QUIC Stream packet using the Spin bit marked 1 and applies the processing. In the present case, the device counts it and adds the corresponding amount of data to the application App Serv 3 by virtue of the information transmitted in the Stream packet, i.e., the attribute relating to the application App Serv 3;
  Step F: the QUIC stack of the server receives a QUIC Stream packet and it processes the messages of the packet;
  Step G: the device routes QUIC packets sent by the server to the terminals attached to the TCU module, or specifically to the TCU module but does not apply processing since it is the QFLOW_A mode. In the QFLOW_B mode, the QUIC packets sent by the server are processed according to the processing applied to the packets sent by the TCU module.

In the QFLOW_B mode, the above step B is modified so that the TCU module notifies the server to activate the QFLOW_B mode, thus indicating that the Spin bit is used to identify the transporting of messages to be counted in the QUIC packets. The above steps F and G are also modified as follows:
  Step F: when the server receives a QUIC packet with the spin bit set to 1, it extracts the QUIC messages this embodiment, the messages are themselves QUIC packets) from the packet and stores a list of identifiers associated with the messages in a stream table. Next, it processes each frame:
    backs-up the identifiers;
    processes each QUIC Stream packet;
    responds to each QUIC Stream packet;
    adds response messages (or attributes relating to the response messages) to the messages received in a QUIC Stream packet;
  Step G: sending the QUIC Stream packet to the TCU module (by indicating the address of the terminals that generated the App Serv 3 messages);
  Step Gbis: the device identifies the QUIC Stream packet received from the server and applies the message counting processing from the messages or attributes present in the QUIC message.

The QFLOW_C mode differs from the two aforementioned modes by virtue of a different identification of the Stream packets. The applied processing can differ as a function of the identification of the received Stream packet. For example, the processing can be applied as a function of the application, as a function of the entity responsible for the payment of the messages, as a function of the terminal transmitting the messages or even a combination of these criteria:

According to one example, in this QFLOW_C mode, the counting is performed as a function of the entity responsible for the payment of the messages. The attributes of the messages are consolidated into QUIC packets used to bill a particular entity.

Use of 3 spin bit and RR bits to distinguish several counting modes.

The bits correspond to an entity for billing the messages:

{[name: com.car.android.app, payer: Company A, Id: 010];

[name: com.netflix.android.app, payer: Company B, Id: 011];

[name: com.poki.android.app, payer: User C, Id: 110];

[name: com.sponsordata.android.app, payer: Manager TCU, Id: 101].

According to another example, the count is managed per category of applications. In this example, the 3 spin bit and RR bits of the QUIC header indicate the category of the packet, i.e., a set of applications for which the messages are to be consolidated and marked so as to then be processed by the device. An example is proposed below:

{[name: com.car.android.app, id: 100];

[name: com.netflix.android.app, 101];

[name: com.poki.android.app, id: 110];

[name: com.sponsordata.android.app, id: 111].

With reference to FIG. 5, an implementation of the method for counting a packet according to one embodiment of the invention is provided.

The entities 10, 20, 30, 40, 50, 60 and 100 are equivalent to the entities same reference signs in FIG. 1, FIG. 2 and FIG. 3.

During a step 400, the terminal unit 30 attaches and connects to the access equipment 40. An encrypted session is considered to be established between the terminal unit 30 and the data server 20. This means that the data packets exchanged between the terminal unit 30 and the data server 20 are encrypted using an encryption key, for example, a private encryption key, and the data server decrypts the received packets using a decryption key, for example, a public key, corresponding to the encryption key. Correspondingly, the packets transmitted by the data server 20 to the terminal unit 30 are encrypted and then decrypted. During a step 401, the terminal 60 transmits packets relating to an application App4 to the terminal unit 30, so that it transmits them in a step 402 to the data server 20 with which the terminal has established a session. According to one example, the application App4 is a web access application. As indicated above, the packets transmitted during the step 402 are encrypted using a security key. The transmitted packets further comprise a determining datum notifying the data server 20 of the security key actually used for encrypting the packets. According to one example, the determining datum corresponds to values of one or more binary element(s) of the header of the packets, such as, for example, a binary phase element as defined, for example, in the TLS and QUIC protocols for notifying the data server of a key change, with the new key being computed from an algorithm and from the key previously used for exchanging packets. Thus, the packets are successively exchanged with different keys, with the key change being indicated by a phase change. The determining datum can therefore correspond to the phase change bit or even to a phase change bit and additional bits for enhancing the information relating to the key used by the terminal unit for sending packets to the data server 20. During a step 403, the terminal unit 30 sends packets relating to an application App6 to the data server 20. According to one example, the application App6 is a security application allowing the position of the vehicle 10 to be determined when it moves and allowing emergency services to be organized in the event of a problem, such as a vehicle breakdown or an accident.

Throughout the remainder of the embodiment it is considered that counting packets relating to an application App5, namely video streaming, must be implemented by the terminal unit 30 in such a way that the data relating to the video streaming service used by the terminal 60 is effectively billed to the user of said service and not to the owner of the vehicle 10, for example. This activation can be static, i.e., a list of applications for which the counting must be implemented is held by the terminal unit 30. This activation also can be dynamic, for example, following the reception of a request transmitted by a platform for administrating applications or the terminal unit 30.

According to an alternative, during a step 404, the terminal unit transmits a message for activating a method for capturing packets to the device 50, allowing the device to be set to listen in order to identify cooperation packets transmitted by the terminal unit 30, so that the packets can be counted. During this step 404, according to one example, the terminal unit can also indicate a used connection identifier that will be added to the cooperation packet and that the device can effectively identify. Thus, it will be able to identify the cooperation packets from among all the packets routed by the device 50. It should be noted that this connection identifier can be specifically transmitted to the device 50 if, for example, no activation message is transmitted. The activation message can, according to another alternative, also include the decryption key that should be used by the device 50 to decrypt the cooperation packet, possibly according to the connection identifier included in the message. This activation message itself can be encrypted using a key initially made available to the device 50 in a message, not shown in FIG. 5.

According to another alternative, during a step 405, the terminal unit transmits a message for activating the capturing method to the data server 20 that is implemented by the device 50. This message is intended to notify, on the one hand, the data server 20 that keys initially used for encrypting packets between the terminal unit 30 and the data server 20 can be used for other purposes, for encrypting cooperation packets. A further aim of this activation message is to notify the data server 20 to implement the counting method in such a way that the packets exchanged in a two-way session between the terminal unit 30 and the data server 20 are counted in order, for example, to then be billed to the owner of the terminal 60.

During a step 406, the terminal 60 sends a request to access a video streaming service to the data server 20 by means of the terminal unit 20 connecting the terminal 60 to the network 100.

During a step 407, the terminal unit 30 initializes a counter for the packets received from the terminal 60 and relating to the application App5. The terminal unit increments the counter with the number of packets received from the terminal 60. It should be noted that the counter can comprise the number of packets or even the amount of data corresponding to the received packets. According to one example, the counter uses the Mbits as a unit of the counter. According one example, the terminal unit 30 initializes one counter per terminal and increments the counter for the packets sent by the corresponding terminal or even uses a counter for the application App5 independently of the terminal sending the packets. According to another example, the counter is incremented as a function of the packets received from a terminal for a set of applications. Thus, all the packets received from the terminal 60 can be counted.

According to this example, the packets relating to the application App4 and App5 are counted by the terminal unit 30.

During steps 408 and 409, the terminal 60 sends new packets relating to the application App5 and the terminal unit 30 increments the counter initialized during step 407.

During a step 410, the terminal unit 30 adds the incremented counter to a cooperation packet. This addition can occur after an elapsed time following the initialization of the counter, once the counter reaches a certain amount of data or packets or even after receiving a message from a management server. The terminal unit 30 also determines a determining datum to be added to the cooperation packet. According to one example, this determining datum corresponds to an encryption key previously used by the terminal unit 30 to transmit data to the data server 20. For example, the determining datum can be the determining datum used for sending the packets during step 402 and/or 403, particularly if this datum is no longer used for sending packets during steps 406 and 409, for example. According to an alternative, the cooperation packet comprises a connection identifier, as is possibly indicated in the activation message during step 405. According to another example, the connection identifier comprises binary elements of a protocol, in particular a secure data multiplexing protocol. This connection identifier can, according to one example, comprise the Spin Bits and Reserve Bits of the QUIC protocol or equivalent bits of the HTTP2 or HTTP3 protocols. The connection identifier can, according to another alternative, comprise the data for determining the packet. According to this example, the device identifies the cooperation packet from the determining datum as indicated hereafter.

During a step 411, the terminal unit transmits the cooperation packet to the data server 20 by means of the device 50. The cooperation packet comprises the data for determining the encryption key used for encrypting the cooperation packet, as well as the incremented counter and possibly a connection identifier used by the device 50 in order to identify the cooperation packet from among all the received packets.

The device 50, if it has received the activation message during step 404 or even by default as soon as it receives packets, implements an analysis of the packets received from the terminal unit 30. This analysis can involve comparing values of connection identifiers and/or of determining data of the received packets.

During a step 412, the device 50 receives the cooperation packet and identifies it using the connection identifier, if it is present in the packet, and/or of the datum for determining the encryption key used. In this latter case, knowing that the previously received packets no longer include this determining datum, the reception of a packet comprising a determining datum distinct from the packets to be routed within a given time interval notifies the device 50 that it is a cooperation packet. According to one example, when the device 50 no longer receives packets during a time period with a value v0 as a determining datum and begins to receive packets with a value v1, it can initialize a timer, and if it again receives a packet with a value v0 as a determining datum after a certain delay following the initialization of the timer, the packet is likely to be an information packet. In the case whereby this determining datum corresponds to a newly used encryption key for exchanging packets between the terminal unit 30 and the data server 20, the device 50 cannot decrypt this packet, which will have been falsely identified as a cooperation packet since it does not hold the key for decrypting such a packet. The datum for determining the received information packet differs from the data for determining data packets received before and/or after the reception of the information packet, this information packet can be detected using this determining datum. The encryption/decryption key associated with the datum for determining the information packet could, according to one example, be used during a previous session between the terminal unit 30 and the data server. According to another example, a session context can be maintained between the terminal unit 30 (or a terminal connected thereto) and the data server 20 and, when a new connection is established, the session context is reestablished, for example, using cookies and a key can be reused that corresponds to a previous connection of the same session, the context of which is maintained. According to yet another example, the encryption key associated with the determining datum was used during session initialization exchanges ("Handshake") between the terminal unit 30 and the data server 20. In the case whereby the identification is also or is only based on the connection identifier, the device 50 should then compare the value of the connection identifier with one or more value(s) of identifiers corresponding to information packets.

According to an alternative, in particular in the case whereby the device 50 has not previously received the key corresponding to the data for determining the information packet, the terminal unit transmits, during a step 413, a key for decrypting the received information packet. This alternative helps to avoid any errors and the decryption of packets that are not information packets but for which the determining datum corresponds to a key actually used for encrypting/decrypting data.

According to one example, during a step 414, the device transmits the counter to a billing unit 80 converting the counter into billing information that will be transmitted to the user of the terminal 60, the counter can comprise information concerning the application App5, with the terminal having sent the packets, or even time-stamp information of the packets relating to the application App5. According to an alternative, during a step 415, the cooperation packet is removed from all the packets to be sent to the data server 20. Knowing that the information present in the information packet is intended to be processed by the device, the data server 20 does not need to receive this packet, which also contains a determining datum normally no longer used for decrypting the packets received from the terminal unit 30.

According to one example, during a step 416, the data server 20 implements the counting method as implemented by the terminal unit 30 and is able to count the packets relating to the application App5, to initialize a counter of these packets and to add it to an information packet transmitted to the terminal unit so that it is sent to the device 50 after it is identified by a determining datum, possibly different from the data used by the terminal unit 30 and/or a connection identifier possibly also different from the connection identifier used for the information packets sent by the terminal unit 30. In this respect, exchanges between the data server 20 and the device 50 have been able to be previously produced in accordance with step 404 described above.

During a step 417, the data server 20 transmits, via the device 50, the access unit 40 and the terminal unit 30, packets relating to the application App5, in order to transmit the video content required by the terminal 60 during step 408. During a step 416, the device 50 analyzing the packets received from the data server 20 identifies an information packet using the information described above, and possibly stores it if it does not have the key yet, allowing it to be decrypted and the counter to be extracted in order to transmit it to the billing equipment 80 during a step 419.

The counting method implemented by the terminal unit 30, and possibly by the data server 20, thus enables the device 50, in collaboration with the billing equipment 80, to be able to bill the packets and therefore the data of the application App5. The use of such methods thus allows the data to be counted that relates to each application and allows encryption/decryption keys to be reused that are no longer used for transmitting packets comprising the useful data of the applications, i.e., required for accessing the audio, video, text of the various applications.

With reference to FIG. 6, an implementation of the counting method according to another embodiment of the invention is shown.

The counting method and the corresponding capturing method can be implemented in accordance with several modes entitled RFLOW_A and RFLOW_B.

The RFLOW_A mode is a one-way mode that does not require modification in the server since the device removes the cooperation packets after receiving a signal from the terminal, or after a time period has elapsed or even when an amount of data has been received. The RFLOW_A mode thus defines a cooperation packet in an extension of the QUIC protocol that allows data to be exchanged with the device (application type, counters). The cooperation packet is encrypted with a key, called 1-RTT key, used in phase 0 (initialization of the session) of the QUIC protocol. The terminal unit sends the 1-RTT key of phase 0 of the QUIC at the time of its choice during or after the end of the connection. The device records all or some of the messages exchanged between the terminal unit and the data server, in order to identify and decode the cooperation packets after receiving the cooperation key for decrypting the registered cooperation packets.

The RFLOW_B mode differs from the RFLOW_A RFLOW_B mode as follows. In addition to RFLOW_A, the two-way RFLOW_B mode activates the extension (the counting method) on the server side by sending a QUIC COOP_MODE Transport Parameter, for example, when the session is established between the terminal unit and the data server. Thus, the server will not end the connection based on an error when it will receive 1-RTT messages after the transition phase. Indeed, if it does not activate the counting method, it could consider that the reception of encrypted packets with a key that normally is no longer used is an error. Furthermore, the server can also send and receive cooperation packets.

FIG. 6 describes an embodiment relating to the RFLOW_A mode.

A UA (terminal unit) establishes a session with a data server (SRV) for routing messages (or packets) via a device (GW), for example, managed by an operator of a communication network.

Step 0: Step (0) the terminal VA and the device GW exchange encryption ENC_KEY_UA and decryption DEC_KEY_UA keys.

Various types of encryption/decryption keys can be used, for example:
- a key, called "external PSK" key, as defined in document: https://tools.ietf.org/html/draft-ietf-tls-tls13-cert-with-extern-psk-07 is made available to the UA by the device GW;
- An eSNI key for recording DNS eSNI of the FQDN of the GW as defined in document: https://tools.ietf.org/html/draft-ietf-tls-esni-05.

Step A: the device activates the method for capturing packets received from the terminal unit UA. It should be noted that this step can be carried out after receiving a message for activating capturing by the UA.

Step B: "Handshake" messages exchanged between the UA and the SRV. The messages use keys identified by a determining datum corresponding to a phase 0. This key is the future cooperation key. Hereafter, it is called the initial phase 0 key or even a phase 0 reconnection key, even if it can be any type of key as described in step 0.

Step C: data packets relating to applications, for example, sent by terminals connected to the VA and not shown in FIG. 6, are exchanged between the LA and the SRV. At this point, the exchanged packets can include determining data corresponding to the ongoing phase (0 in the example) or to a new phase (1 in the example). The data packets actually can be encrypted with a new encryption key.

Step D: GW activates the RFLOW extension of the capturing method after a delay of n ms without a packet comprising a determining datum corresponding to the supposed active phase (0 in the example), or after n consecutive packets comprising a determining datum corresponding to the new phase (1 in the example), which should no longer be used for exchanging packets between the UA and the SRV after the encryption key is changed. From this point, the packets of the previous phase (for which the determining datum corresponds to phase 0) are considered to be cooperation packets and are captured, and removed from the stream of packets exchanged between the UA and the SRV by GW.

According to one example, GW uses the standard marking bit for inverted QUIC phase packets as a determining datum.

By way of a generalization, thereafter the phase (determining datum) will be inverted again and will return to phase 0. GW will then suspend the RFLOW extension upon detection of a cooperation packet that it fails to decrypt. This packet will be sent to the server SRV and not stored by GW. Then, it will activate the RFLOW extension after a delay of n ms without a packet from the previous phase set to 1 or after n consecutive packets comprising a determining datum corresponding to the new phase (0 in the example). These packets of the previous phase (called cooperation phase) are captured and removed from the stream by GW.

Step E: exchanging unmarked data packets with a determining datum corresponding to a phase set to 1.

Step F: counting the messages (which can be packets or different types of data), and adding the counter to a cooperation packet. Setting the phase (determining datum) of the cooperation packet to 0. Sending the cooperation packet to the GW.

Step G: capturing the cooperation packet comprising the counter by identifying the phase set to 0 used as a determining datum. It should be noted that the decryption key associated with the initial phase 0 can be sent by the UA to the GW, alternatively or in addition to being sent during step 0.

If the RFLOW_B mode is implemented. After the Handshake messages are exchanged or when the Handshake messages are exchanged, a message for activating the extension (of the counting method) is transmitted by the UA to the SRV.

In addition, in this RFLOW_B mode, the GW does not remove the cooperation packets from all the packets routed by the GW between the UA and the SRV. The cooperation packets with a determining datum corresponding to a cooperation packet (phase 0) are therefore received by the SRV. In accordance with the sessions established between the UA and the SRV, the server SRV sends data to the UA, which may or may not be in response to the data packets received from the UA. The SRV implements the counting method and the GW also captures the cooperation packets transmitted by the SRV to the UA by selecting the cooperation packets as a function of the value of the determining datum present in the packets also received from the server SRV. In this RFLOW_B mode, the UA will also receive the cooperation packets.

It should be noted that, according to the prior techniques, in the QUIC and TLS 1.3 protocols, the session is reconnected using the key used during the previous connection. According to this mode, the corresponding counting and capturing method recycles the key as 0-RTT in order to mark the cooperation packets to be identified by the GW.

When a new session is involved, i.e., no session has been previously established, the implementation of the method as described hereafter can be deployed.

When the equipments UA and SRV establish a first connection (i.e., the pre_shared_key extension has not been activated), once the handshake is finished and the master_secret is obtained, the UA and the SRV derive the cooperation_secret using the operation:
 cooperation_secret=QHKDF-Expand(master_secret "coop s", hash.length).

This secret is then made available to GW, which can (like the UA and the SRV) compute the key and the initialization vector (iv—initialization vector) using the following operations:
 key=QHKDF-Expand(cooperation_secret, "key", key_length);
 iv=QHKDF-Expand(cooperation_secret, "iv", iv_length).

Furthermore, it should be noted that the RFLOW_A and RFLOW_B modes can be combined in order to increase the cooperation levels by creating several modes for identifying the cooperation packets by GW:
 a spin bit S identifies the cooperation packets and the RR bits (R1, R2) distinguish several cooperation modes:
  In the RFLOW_A mode, S set to 1 indicates that the packet is a cooperation packet (DEC_KEY_UA usage key for decrypting).
  Advanced options: the use of the R1 and R2 bits distinguish 4 types of cooperation packets:
   Read: 00 to indicate a QUIC packet comprising a GW-readable area;
   Delete: 01 to indicate a QUIC packet readable by the gateway and to be removed by GW;
   Update: 10 to indicate a QUIC packet that can be modified in plain text by GW (no encryption);
   Modif: 11 to indicate a QUIC end-to-end packet open to the cooperation in write mode.

With reference to FIG. 7, an example of a structure of a discrimination device 500 according to one embodiment of the invention is shown.

The discrimination device 500 implements the discrimination method, different embodiments of which have been described above. The discrimination device can be implemented in a device of a communication network, such as a terminal unit, an equipment for accessing a local network, such as a home gateway, a terminal or a router-type equipment.

For example, the device 500 comprises a processing unit 530, fitted, for example, with a microprocessor μP, and controlled by a computer program 510, stored in a memory 520 and implementing the discrimination method according to the invention. Upon initialization, the code instructions of the computer program 510 are loaded, for example, into a RAM, before being executed by the processor of the processing unit 530.

Such a device 500 comprises:
 a marking module 502, capable of:
  adding an attribute relating to the first message to an information packet, said packet consolidating attributes to which processing is applied;
  applying a marking of the information packet comprising the added attribute;
 a transmitter 503 capable of sending the information packet comprising the applied marking to a data server.

With reference to FIG. 8, an example of a structure of a processing device according to one embodiment of the invention is shown.

The processing device 600 implements the processing method, various embodiments of which have been described above. The processing device 600 can be implemented in a device of a communication network such as a router, a firewall, a stream inspection equipment (Deep Packet Inspection), or even a data server.

For example, the device 600 comprises a processing unit 630, fitted, for example, with a microprocessor μP, and controlled by a computer program 610, stored in a memory 620 and implementing the processing method according to the invention. Upon initialization, the code instructions of the computer program 610 are loaded, for example, into a RAM, before being executed by the processor of the processing unit 630.

Such a device 600 comprises:
 a receiver 601 capable of receiving an information packet from a terminal unit;
 a detector 602 capable of detecting an information packet comprising the attribute added by the terminal unit, as a function of a marking applied to the received information packet;
 a processing module 603 capable of processing the attribute included in the received information packet.

With reference to FIG. 9, an example of a structure of a capturing device 700 according to one embodiment of the invention is shown.

The capturing device 700 implements the capturing method, various embodiments of which have been described above. The capturing device 700 can be implemented in a device of a communication network, such as a router, a firewall, a stream inspection equipment (Deep Packet Inspection), or even a data server.

For example, the device 700 comprises a processing unit 730, fitted, for example, with a microprocessor μP, and controlled by a computer program 710, stored in a memory 720 and implementing the capturing method according to the invention. Upon initialization, the code instructions of the computer program 710 are loaded, for example, into a RAM, before being executed by the processor of the processing unit 730.

Such a device 700 comprises:
 a receiver 704 capable of receiving a plurality of packets from a terminal unit;
 an analyzer 701 capable of analyzing a plurality of packets sent by a terminal unit and destined for the server;
 an identification module 702 capable of identifying a cooperation packet from among the plurality of analyzed packets, said cooperation packet comprising the determining datum corresponding to a security key used for encrypting packets transmitted by the terminal unit to the data server before the terminal unit sends said cooperation packet;

a decryption module 703 capable of decrypting the received cooperation packet using a security key corresponding to the determining datum of the identified cooperation packet.

With reference to FIG. 10, an example of a structure of a counting device 800 according to one embodiment of the invention is shown.

The counting device 800 implements the counting method, various embodiments of which have been described above. The counting device 800 can be implemented in a device of a communication network such as a terminal unit or an equipment for accessing a local network, such as a home gateway, or a terminal or a router-type equipment.

For example, the device 800 comprises a processing unit 830, fitted, for example, with a microprocessor µP, and controlled by a computer program 810, stored in a memory 820 and implementing the counting method according to the invention. Upon initialization, the code instructions of the computer program 810 are loaded, for example, into a RAM, before being executed by the processor of the processing unit 830.

Such a device 800 comprises:
a transmitter 802 that
capable of transmitting a plurality of packets each comprising a datum for determining a security key used for encrypting the packet;
capable of transmitting a cooperation packet comprising the added counter to the data server;
a computer 801 capable of incrementing a counter of the application-related data, in particular sent to the data server, and capable of adding the incremented counter to a cooperation packet comprising the determining datum corresponding to a security key used for encrypting packets of the plurality of packets exchanged between the terminal unit and the data server prior to sending said cooperation packet.

The invention claimed is:

1. A capturing method for capturing a packet from an encrypted session established between a terminal unit and a data server, said packet comprising a datum for determining a security key used for encrypting the packet, the method being implemented by a device routing the packet between the terminal unit and the data server and comprising:
analyzing the datum for determining the security key of a plurality of received packets transmitted by the terminal unit and destined for the server;
identifying a cooperation packet from among the plurality of transmitted packets, said cooperation packet comprising a value of the determining datum, distinct from a value of the data for determining the security keys of the other packets of the plurality of packets, said value of the determining datum of the cooperation packet corresponding to a security key used for encrypting packets transmitted by the terminal unit to the data server prior to the terminal unit sending said cooperation packet; and
decrypting the cooperation packet using a security key corresponding to the value of the determining datum of the identified cooperation packet.

2. The capturing method as claimed in claim 1, wherein the determining datum is a binary phase element indicating a key change to be used by the terminal and the data server for encrypting and decrypting packets exchanged between the terminal unit and the data server.

3. The capturing method as claimed in claim 1, wherein the cooperation packet is a packet of a secure data multiplexing protocol and the cooperation packet is identified from one or more of the following parameter(s):
phase bit;
value of a spin bit of a QUIC (Quick UDP Internet Communications) transport protocol packet; value of RR bits of the QUIC transport protocol packet;
connection identifier.

4. The capturing method as claimed in claim 1, wherein the cooperation packet is identified after activating, in the device, detection of the packets for which the determining datum has a value that differs from the determining datum of a plurality of successive packets previously received from the terminal unit.

5. The capturing method as claimed in claim 1, wherein the security key associated with the determining datum is transmitted by the terminal unit to the device after an end of the session between the terminal unit and the data server.

6. The capturing method as claimed in claim 1, wherein the security key associated with the determining datum was used for securing an exchange of packets from a previous session between the terminal unit and the data server.

7. The capturing method as claimed in claim 1, wherein the security key associated with the determining datum is a key negotiated between the terminal unit and the data server during a step of initializing the session.

8. The capturing method as claimed in claim 1, wherein the cooperation packet is removed from the plurality of packets when routing said plurality of packets to the data server.

9. The capturing method as claimed in claim 1, further comprising analyzing, as well as identifying a cooperation packet, and decrypting the cooperation packet as defined in claim 1, from among the packets transmitted by the data server to the terminal unit.

10. A device for capturing a packet from an encrypted session established between a terminal unit and a data server, said packet comprising a datum for determining a security key used for encrypting the packet, the device comprising:
a processor; and
a non-transitory computer readable medium comprising instructions stored thereon which when executed by the processor configure the device to implement a method comprising:
analyzing the datum for determining the security key of a plurality of received packets transmitted by the terminal unit and destined for the server;
identifying a cooperation packet from among the plurality of transmitted packets, said cooperation packet comprising a value of the determining datum, distinct from a value of the data for determining the security keys of the other packets of the plurality of packets, said value of the determining datum of the cooperation packet corresponding to a security key used for encrypting packets transmitted by the terminal unit to the data server prior to the terminal unit sending said cooperation packet;
a decryption module, capable of decrypting the cooperation packet using a security key corresponding to the value of the determining datum of the identified cooperation packet.

11. A non-transitory computer readable medium comprising a computer program stored thereon comprising instructions for implementing a capturing method, when the program is executed by a processor of a device routing a packet between a terminal unit and a data server, the capturing method capturing the packet from an encrypted session established between the terminal unit and the data server, said packet comprising a datum for determining a security key used for encrypting the packet, the method comprising:

analyzing the datum for determining the security key of a plurality of received packets transmitted by the terminal unit and destined for the server;

identifying a cooperation packet from among the plurality of transmitted packets, said cooperation packet comprising a value of the determining datum, distinct from a value of the data for determining the security keys of the other packets of the plurality of packets, said value of the determining datum of the cooperation packet corresponding to a security key used for encrypting packets transmitted by the terminal unit to the data server prior to the terminal unit sending said cooperation packet; and decrypting the cooperation packet using a security key corresponding to the value of the determining datum of the identified cooperation packet.

* * * * *